United States Patent
Scherrer et al.

(10) Patent No.: US 9,352,540 B2
(45) Date of Patent: May 31, 2016

(54) DEVICE AND METHOD FOR COVERING FALSE-WALL PANELS WITH A RESTORATION DEVICE

(71) Applicants: Jean-Marc Scherrer, Riedisheim (FR); Mario Maheux, Quebec (CA)

(72) Inventors: Jean-Marc Scherrer, Riedisheim (FR); Mario Maheux, Quebec (CA)

(73) Assignees: Jean-Marc Scherrer, Riedisheim (FR); Mario Maheux, Quebec (CA)

( * ) Notice: Subject to any disclaimer, the term of this patent is extended or adjusted under 35 U.S.C. 154(b) by 208 days.

(21) Appl. No.: 14/350,587

(22) PCT Filed: Oct. 11, 2012

(86) PCT No.: PCT/FR2012/052312
§ 371 (c)(1),
(2) Date: Apr. 9, 2014

(87) PCT Pub. No.: WO2013/054047
PCT Pub. Date: Apr. 18, 2013

(65) Prior Publication Data
US 2015/0122401 A1 May 7, 2015

(30) Foreign Application Priority Data
Oct. 11, 2011 (FR) ...................................... 11 03096

(51) Int. Cl.
*B32B 38/00* (2006.01)
*E04B 9/04* (2006.01)
*G09F 15/00* (2006.01)
*B32B 37/12* (2006.01)
*B32B 37/16* (2006.01)
*B32B 43/00* (2006.01)

(52) U.S. Cl.
CPC ......... *B32B 38/1875* (2013.01); *B32B 37/1292* (2013.01); *B32B 37/16* (2013.01); *B32B 38/0004* (2013.01); *B32B 38/0012* (2013.01); *B32B 43/00* (2013.01); *E04B 9/04* (2013.01); *E04B 9/0428* (2013.01); *G09F 15/0025* (2013.01); *B32B 2038/0016* (2013.01); *B32B 2305/18* (2013.01); *B32B 2309/16* (2013.01);*B32B 2419/00* (2013.01); *E04B 2009/0492* (2013.01)

(58) Field of Classification Search
CPC B32B 38/1875; B32B 43/00; B32B 38/0012; B32B 38/0004; B32B 37/16; B32B 37/1292; B32B 2038/0016; B32B 2305/18; B32B 2309/16; B32B 2419/00
USPC .......................... 160/378; 209/405; 101/127.1
See application file for complete search history.

(56) References Cited

U.S. PATENT DOCUMENTS 4,968,366 A * 11/1990 Hukki ................... B07B 1/4618
156/153

FOREIGN PATENT DOCUMENTS

FR 2793505 A1 11/2000

*Primary Examiner* — Jeff Aftergut
*Assistant Examiner* — Jaeyun Lee
(74) *Attorney, Agent, or Firm* — Bachman & LaPointe, P.C.

(57) ABSTRACT

The invention relates to a device for tensioning the fabric of a device for restoring a removable panel, characterized in that it comprises at least one structure, a thermal chamber arranged inside said structure and able to heat said flexible fabric, an internal frame elastically secured to said thermal chamber, and at least one actuator secured to the structure and able to move the thermal chamber so that, on the one hand, the thermal chamber is moved between a "fabric at rest" position and a "fabric stretched" position and, on the other hand, to move the internal frame between a "fabric at rest" position and an intermediate position located between said "fabric at rest" and "fabric stretched" positions, the flexible fabric resting on part of the thermal chamber and being held by its peripheral edge between the internal frame and the structure. The invention also proposes a method for coating a removable panel that uses the tensioning device.

10 Claims, 3 Drawing Sheets

DEVICE AND METHOD FOR COVERING FALSE-WALL PANELS WITH A RESTORATION DEVICE

BACKGROUND

The present disclosure relates to a device for tensioning a fabric of a device for restoring a removable panel of a false wall such as, for example, a false ceiling and a false wall. The present disclosure also relates to a method for coating such a panel using said device.

False walls have long been known, which are arranged parallel to one wall of a room so as to leave a residual space between the wall of said room and said fabric. This residual space, also called a velum, makes it possible to accommodate all unsightly equipment such as electrical cables, pipes, etc. These false walls, more particularly false suspended ceilings, comprise either removable panels suspended from a grid of sections advantageously made of light-alloy or a generally opaque flexible fabric, deformed by tension so that the edges thereof, provided with fastening means, can be fixed to fastening wall rails fixed to the walls of the room, for example.

Removable panels degrade over time and in particular lose their original aesthetic appearance. To remedy this problem, the degraded panel (s) can be changed and the cuts and holes existing in the original panel(s) can be repeated, if necessary. This method is time-consuming especially when it is necessary to repeat the cut-outs and holes, if any, in the new panel, but also expensive because a new panel has to be bought. In addition, the degraded original panel(s) are thrown away or partially recycled, which goes against the current trend which tends to limit the volume of waste for obvious environmental reasons.

SUMMARY

The present disclosure aims at remedying the various disadvantages described above by providing a device and a method for restoring in a simple, fast and particularly aesthetical way removable panels of a false wall at least partially degraded.

In this respect, a tensioning device is provided which comprises at least one structure, a thermal chamber arranged inside said structure and able to heat said flexible fabric, an internal frame elastically secured to said thermal chamber, and at least one actuator secured to the structure and able to move the thermal chamber so that, on the one hand, the thermal chamber is moved between a "fabric at rest" position and a "fabric stretched" position and, on the other hand, to move the internal frame between a "fabric at rest" position and an intermediate position located between said "fabric at rest" and "fabric stretched" positions, the flexible fabric resting on a part of the thermal chamber and being held by its peripheral edge between the internal frame and the structure.

Advantageously, the thermal chamber comprises a hollow box which having the overall shape of a parallelepiped and containing at least one heat generator and comprising at least a lower face and an upper face provided with a plurality of through-holes for uniformly letting through the heat generated by the heat generator.

Preferably, the thermal chamber comprises an external frame arranged on the top of its upper face and made from abutting sections having the overall shape of an open L, each comprising a first flange fixed horizontally to be in contact on the top of said upper face and a second flange for supporting the fabric, so as to create a residual space between the fabric and said upper face when the flexible fabric is stretched.

Advantageously, the internal frame comprises abutting sections having globally rectangular cross-sections and is secured to said thermal chamber using elastic fixing members.

Said internal frame advantageously comprises at least two opposite sections large enough to abut on the structure, such position defining the intermediate position.

According to a preferred embodiment, the internal frame comprises sections for holding the fabric.

Preferably, the tensioning device comprises two actuators, each one being of the linear electric actuator type integrated in a stable guiding unit.

Finally, the present disclosure also relates to a method for coating a removable panel of a false wall with a restoration device according to the invention characterized in that it comprises at least the following steps, in sequence or not:
  tensioning the fabric using the tensioning device according to the invention;
  positioning at least two cladding sections facing one another respectively along two opposite areas of said peripheral edge of the removable panel;
  application of all removable panel-cladding sections assembly onto the stretched fabric;
  application of adhesive onto the periphery of the removable panel-cladding sections assembly,
  cutting the excess fabric showing from the removable panel.

Advantageously, the step of tensioning the fabric using the tensioning device comprises the steps of:
  positioning the fabric on the thermal chamber and the internal frame, with the thermal chamber and the internal frame being in the "fabric at rest" position;
  starting the heat generators;
  moving the thermal chamber by at least one actuator from the "fabric at rest" position to the "intermediate" position;
  moving the thermal chamber by one actuator for the "intermediate" position to the "fabric stretched" position in order to tension the fabric.

Preferably, the step of applying adhesive is preceded by a step of grinding the peripheral edge of the removable panel.

BRIEF DESCRIPTION OF THE DRAWINGS

Other advantages and characteristics will become more apparent from the following description of several alternative embodiments, given as non-limiting examples, of a device for tensioning a flexible fabric according to the invention, while referring to the appended drawings wherein.

DETAILED DESCRIPTION

Figure 6:
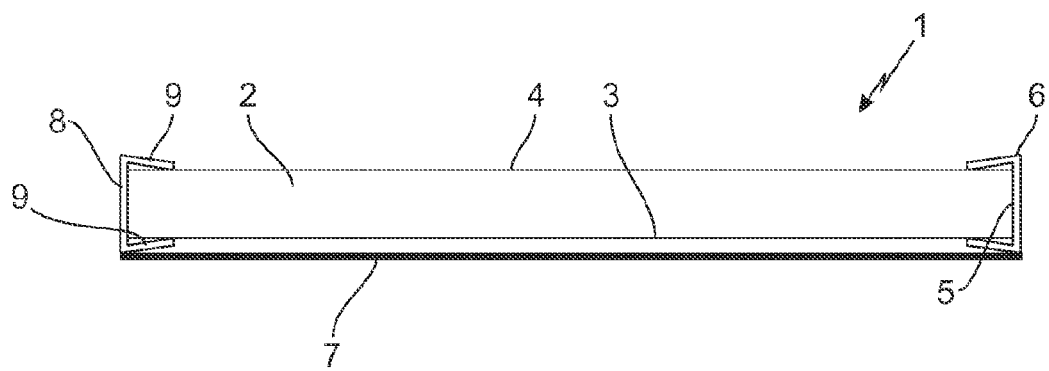
FIG. 6 is a vertical section of the removable panel coated with the flexible fabric.

FIG. 6 shows a restoration device 1 according to the invention for a removable panel 2 of a false wall of a room such as, for example, a false ceiling or a false wall. Said removable panel 2 comprises an outer face 3 visible from the room, an inner face 4 situated on the opposite side of the outer surface 3 and a peripheral edge 5 joining the inner 3 and outer faces 4. Said restoration device 1 comprises at least two cladding sections 6, the vertical cross section of which is in the overall shape of a C the free ends of which preferably are getting closer to each other, and fixed facing one another respectively along two respective opposing regions of the peripheral edge 5 of said removable panel 2 and a fabric 7 is fixed and stretched over at least the two cladding sections 6. Preferably, the cladding sections 6 form a closed frame fixed along the entirety of said peripheral edge 5.

Each cladding section 6 thus comprises a core 8 and two flanges 9 extending from the ends of said core 8, with said flanges 9 forming an angle between 0° and 45°. When the cladding section 6 is fixed to the removable panel 2, the core 8 is in contact with the peripheral edge 5 and the flanges 9 are in contact at least at the free ends thereof respectively with the outer 3 and inner 4 faces (see FIG. 6). Each cladding section 6 is fixed to the removable panel 2 by any appropriate means and/or technology known to those skilled in the art. Thus, each cladding section 6 may, for example, be force-fitted, glued, nailed or screwed onto the removable panel 2.

The flexible fabric 7 is advantageously stretchable and made from a sheet of a polymeric material such as polyvinyl chloride, with said material having numerous properties such as fire resistance, air- as well as dust- or moisture-tightness, maintainability, etc. acoustic performance. The fabric 7 is stretched and fixed on the cladding sections 6 while being supported by at least the flanges 9 thereof respectively in contact with the outer 3 and inner 4 faces of the removable panel 2. In addition, the flexible fabric 7 may be at least partially perforated to increase sound absorption of the room.

In this configuration, it should be understood that the fabric 7 is not in contact with said outer face 3 and the bumps and pits of the outer face 3 of the removable panel 2 are no longer apparent. As a matter of fact, if the fabric 7 was placed directly on the removable panel 2, it should be understood that the bumps and pits would still be visible after the positioning of the fabric 7 thus creating an unsightly appearance. This drawback is avoided by positioning a cladding section 6 on the removable panel 2 and by positioning the fabric 7 on said cladding section 6. The fabric 7 is preferably fixed to the cladding sections 6 using an adhesive, especially by capillarity gluing.

The fabric 7 may be manually pulled and stretched before being fixed, but to get a uniform and rapid tension, the tensioning device 13 shown in FIGS. 1-5 can advantageously be used.

The tensioning device 13 comprises at least one structure 14, a thermal chamber 15 arranged inside said structure 14, at least an actuator 16 and an internal frame 17 secured to said thermal chamber 15, with said heat chamber 15 being able to be moved between a "fabric at rest" position and a <<fabric stretched>> position by said actuator 16.

The structure 14 is provided with at least one globally tubular upper frame 18, a bottom 19 and a plurality of legs 20 connecting said upper frame 18 to the bottom 19.

The thermal chamber 15 is a hollow box in the overall shape of a parallelepiped containing at least one heat generator (not shown) and comprising at least a lower face 151 and an upper face 152 provided with a plurality of through-holes 153 intended for uniformly letting through the heat generated by the heat generator(s), from the inside to the outside of said thermal chamber 15.

Advantageously, the thermal chamber 15 contains two heat generators arranged inside said thermal chamber 15 at each of the longitudinal ends thereof.

Figure 3:
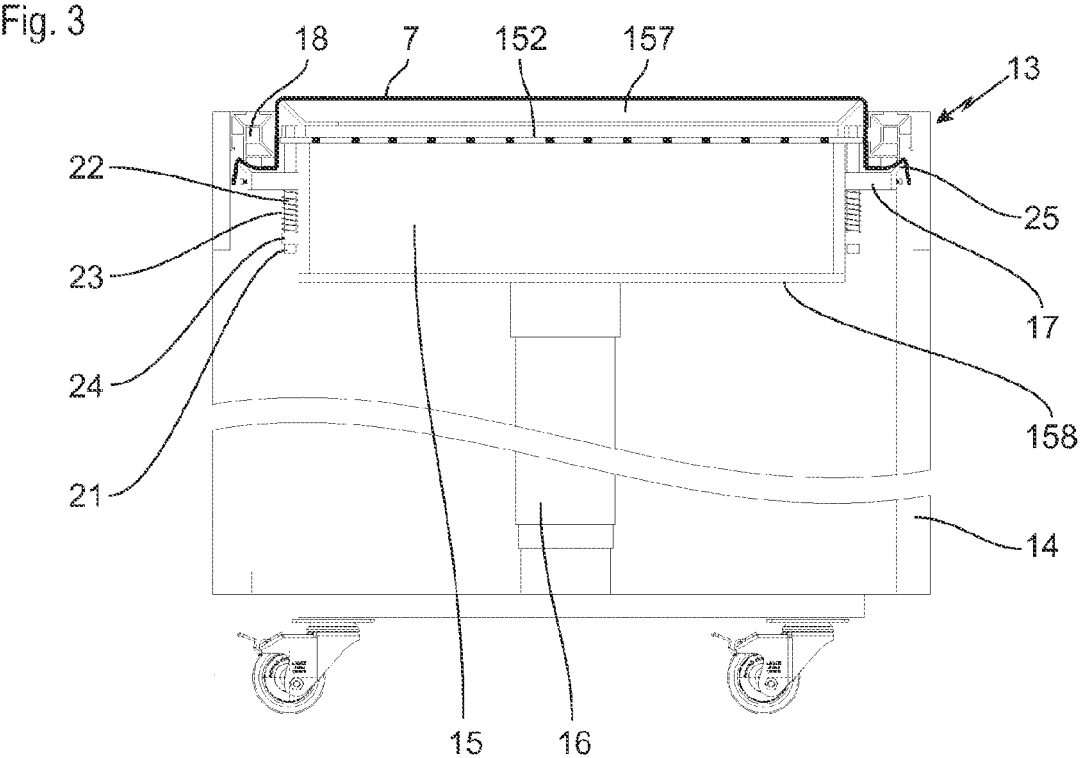
FIG. 3 is a vertical section of the tensioning device of FIG. 1, in the <<fabric stretched>> position.
Figure 4:
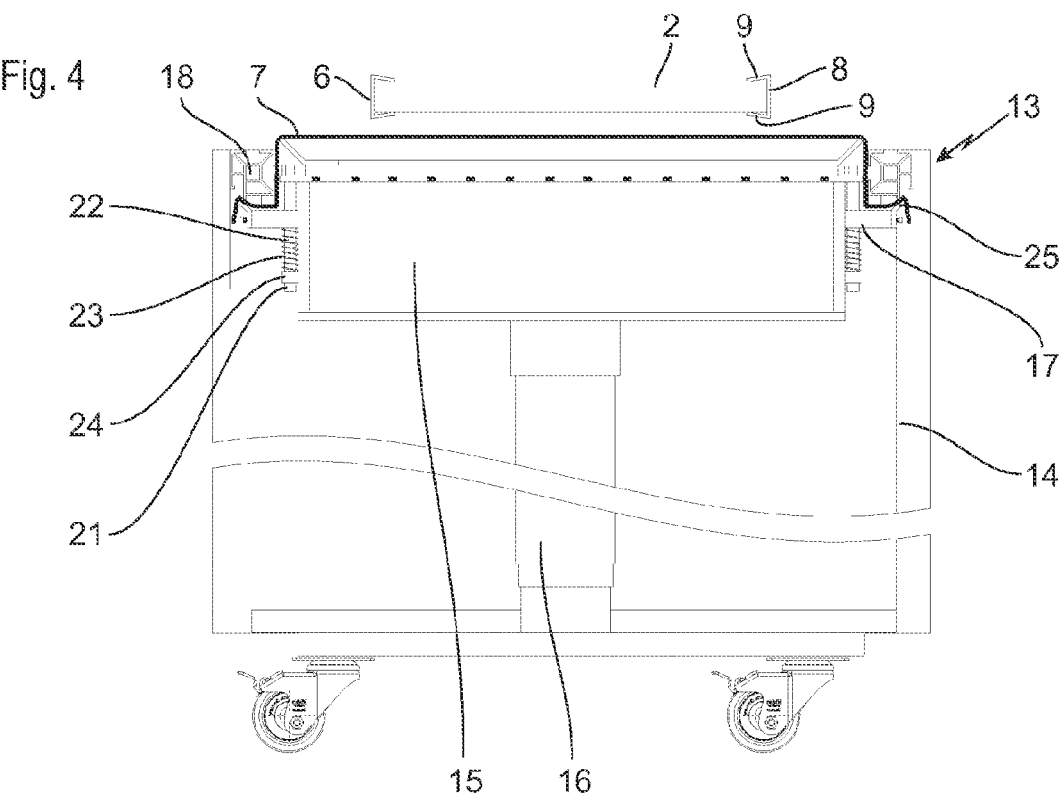
FIG. 4 is a vertical section of the tensioning device of FIG. 3, when a removable panel is moved close to the flexible fabric.

In addition, the thermal chamber 15 comprises an external frame 154 arranged on the top of the upper face 152. This external frame 154 is preferably made from abutting sections having the general shape of an open L, each comprising a first horizontal flange 155 so arranged as to be in contact with the top of said upper face 152, so as to enable the fastening of said external frame 154 on the thermal chamber 15 by any suitable means such as screws for example, and a second angled flange 156 extending toward the outside of said chamber and so arranged as to support the fabric 7 when the latter is placed on the tensioning device 13. The external frame 154 makes it possible to create a residual space 157 between the underside of the fabric 7 and the top of the upper face 152 of the thermal chamber 15. When the flexible fabric 7 is stretched, the residual space 157 makes it possible to avoid any contact between said fabric 7 and the upper face 152 of the thermal chamber 15, as shown in FIG. 3.

The thermal chamber 15 is able to be moved between a "fabric at rest" position and a <<fabric stretched>> position by at least one actuator 16. The tensioning device 13 advantageously comprises two actuators 16, each arranged between the bottom 19 and the underside of the thermal chamber 15 and more particularly near the middle of the side edge of the lower face 158 of the thermal chamber 15.

Each actuator 16 is preferably a linear electric actuator integrated in a stable guiding unit of the telescopic column type. These actuators 16 are connected to a control box (not shown) arranged for example on the structure 14 to adjust, synchronize or to stop the thrust of said actuators 16. The control box preferably has three predetermined tension settings depending on the density of different fabric 7.

The internal frame 17 is preferably a frame made from abutting sections having an overall rectangular cross-section and is secured to said thermal chamber 15 using elastic fixing members 21. These are such that they always exert a force tending to maintain a contact between the internal frame 17 and the thermal chamber 15.

Preferably, these fixing members are assemblies 21 (screw 22-spring 23-nut 24) distributed along the periphery of said thermal chamber 15. The spring 23 is a helical compression spring arranged around the screw 22 between the lower face of the internal frame 17 and the nut 24, with said spring 23 being such that, when the thermal chamber 15 moves away from the internal frame 17 not to be in contact any longer with the latter, it is compressed and exerts a force tending to move the thermal chamber 15 closer to the internal frame 17.

The internal frame 17 is thus also movable on at least one part of the travel of the thermal chamber 15 defined between the "fabric at rest" position and the <<fabric stretched>> position thereof. As a matter of fact, the internal frame 17 comprises at least two opposite sections large enough to abut under the upper frame 18 of the structure 14, preferably on either side of the thermal chamber 15, in order to stop the travel of said internal frame 17 before said "stretched fabric" position while enabling the thermal chamber 15 to continue its travel to the <<fabric stretched>> position. The position wherein the internal frame 17 abuts under the upper frame 18 of the structure 14 is called, in the following, the "intermediate" position. This "intermediate" position makes it possible to secure the peripheral edge of the fabric 7 by holding it clamped between the internal frame 17 and the upper frame 18 of the structure 14.

It should be understood that the elastic fixing members ensure a homogeneous distribution of the thrust of the actuator 16 on the entire fabric 7, so as to reach a perfect tension of the latter.

In addition, the internal frame 17 also comprises removable retaining sections 25 advantageously positioned along its longitudinal faces, held on the internal frame 17 by suitable means such as bolts advantageously provided with springs for example, and enabling to hold the fabric 7 between said internal frame 17 and the upper frame 18 of the structure 14, and supported by the free end 156 of the second flange 156 of the sections of the external frame 154 of the thermal chamber 15.

Thus, the peripheral edge of the fabric 7 is held clamped between, on the one hand, the underside of the upper frame 18 of the structure 14 and, on the other hand, said retaining sections 25 and the internal frame 17. Preferably, a seal strip of the neoprene type, for example, may be fixed to the upper face of the internal frame 17 so as to prevent slippage of the fabric 7 when it is stretched.

With reference to FIGS. 1-6 and in such a configuration of the tensioning device 13, the plurality of steps described below are executed to tension the fabric 7 of a restoration device 1 for coating a removable panel 2.

Figure 1:
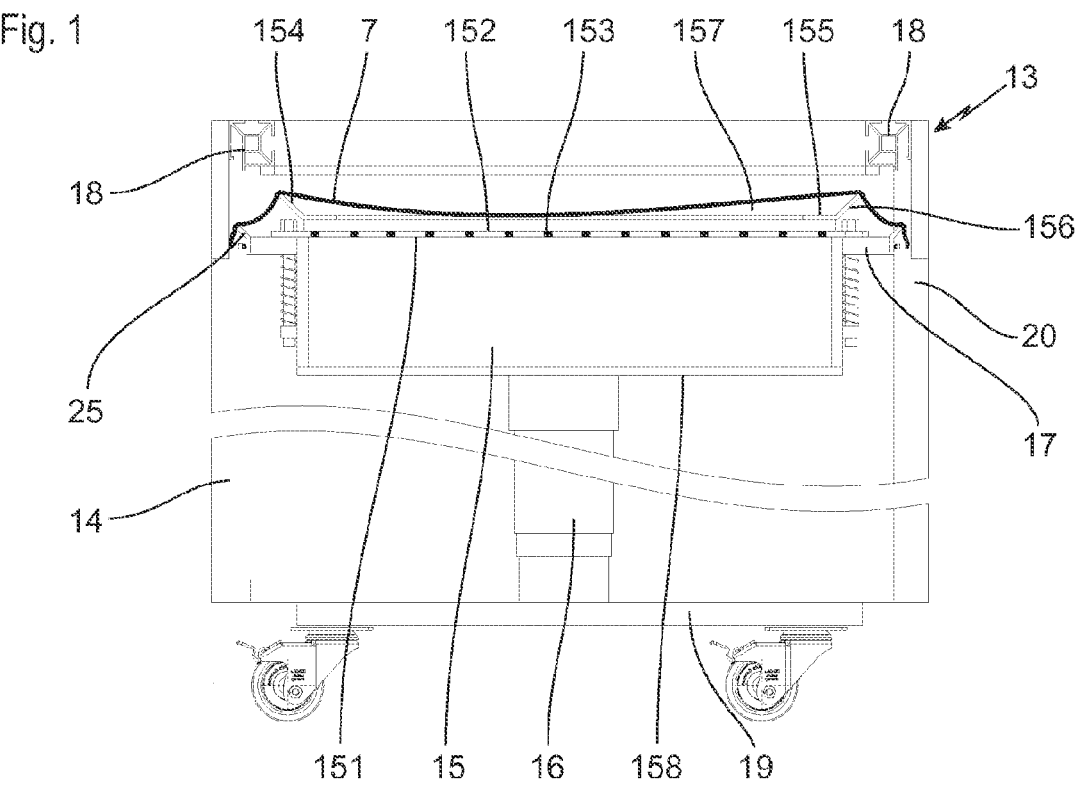
FIG. 1 is a vertical section of the device for tensioning a fabric, according to the invention, of the restoration device of FIG. 6, in the "fabric at rest" position.

Referring to FIG. 1, the fabric 7 is laid on the thermal chamber 15 and the internal frame 17, with said fabric 7 being supported by the free end of the second flange 156 of the sections of the external frame 154 of the thermal chamber 15, with the thermal chamber 15 and the internal frame 17 being in the "fabric at rest" position.

The heat generators are then switched on so as to heat the fabric 7 in order to increase the elasticity of said fabric 7.

Figure 2:
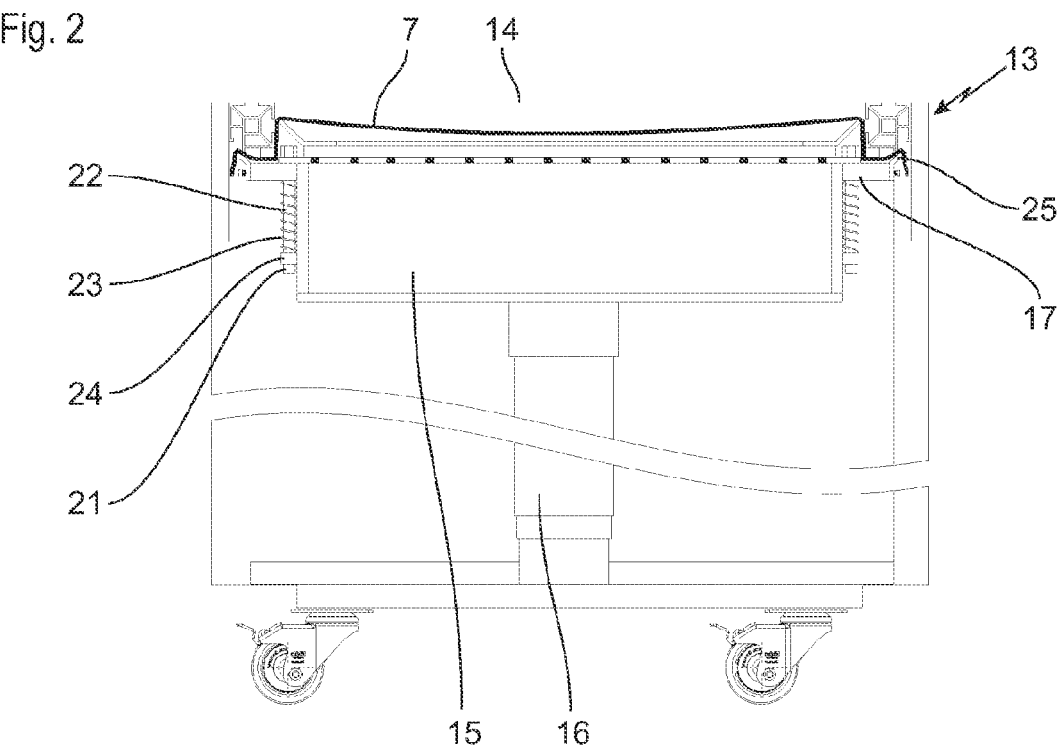
FIG. 2 is a vertical section of the tensioning device of FIG. 1, in an intermediate position.

The thermal chamber 15, and also the internal frame 17 are then moved by at least one actuator 16 from the "fabric at rest" position to the intermediate position, wherein the internal frame 17 abuts against the upper frame 18 of the structure 14, as shown in FIG. 2, the edge of the fabric 7 is then held clamped between, on the one hand, the upper frame 18 of the structure 14 and, on the other hand, said retaining sections 25 and the inner frame 17.

The actuator 16 goes on moving the thermal chamber 15 only, so as to tension the fabric 7, the peripheral edge of which is held on the internal frame 17, by moving the free end of the second flange 156 of the sections of the external frame 154 of the thermal chamber 15, as shown in FIG. 3.

The removable panel 2 is then optionally slightly ground at its peripheral edge 5 so as to be able to fix at least two cladding sections 6 facing one another respectively along two opposite zones of the peripheral edge 5 of said removable panel 2.

Figure 5:
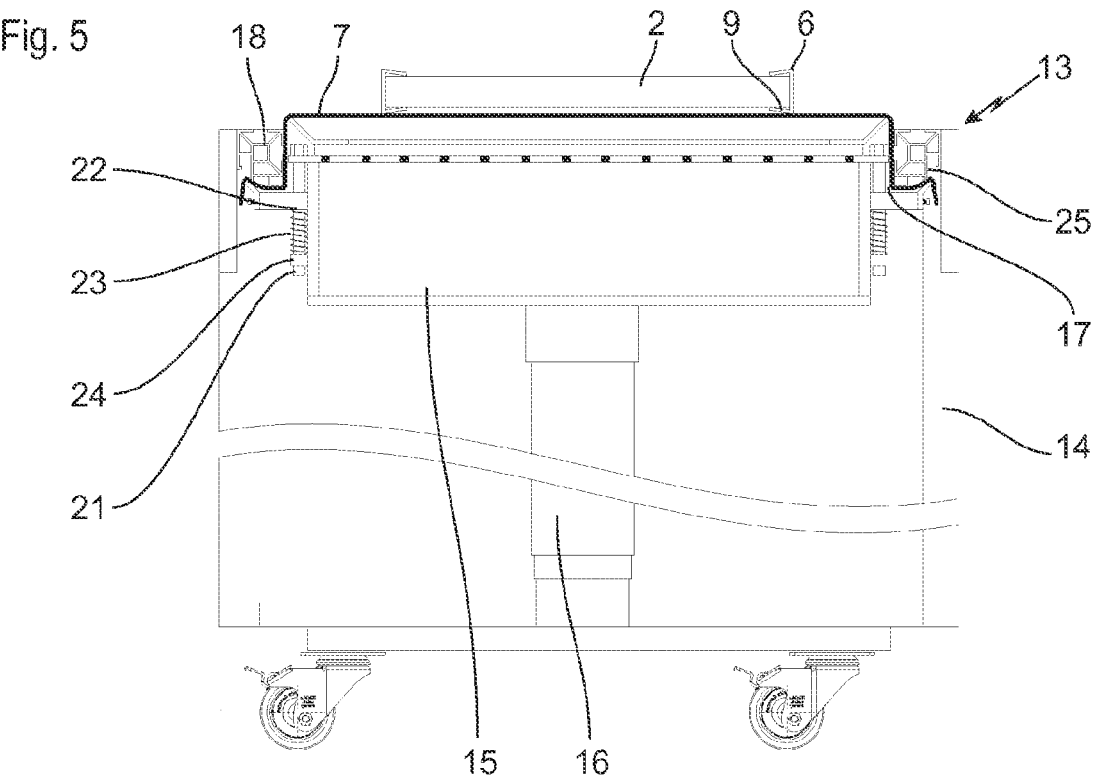
FIG. 5 is a vertical section of the tensioning device of FIG. 3, when the removable panel is in contact with the flexible fabric.

Then the removable panel 2-cladding sections 6 assembly is applied onto the fabric 7, and then the adhesive, for example glue, is deposited onto the periphery of the removable panel 2-cladding sections 6 assembly, and in particular at the end of the flange 9 of the cladding sections 6 on the outer face 3 side to be coated with the removable panel 2, as shown in FIG. 5.

Then, the fabric 7 is roughly cut around the removable panel 2-cladding sections 6 assembly.

Eventually, the excess fabric 7 showing from the removable panel is cut with precision to obtain a removable panel 2 coated with a fabric 7 according to FIG. 6.

It should be understood that these steps may not be performed in the order mentioned. For example, the removable panel 2 may be slightly ground before tensioning the fabric 7 with the tensioning device 13 according to the invention.

Similarly, glue may be deposited onto the cladding sections 6 before applying the removable panel 2—cladding sections 6 assembly onto the fabric 7.

As the fabric 7 has been preheated beforehand and then stretched and eventually glued onto the removable panel 2, it should be understood that, when the fabric 7 cools, it slightly shrinks, which results in increasing the tension of the fabric 7 thus ensuring a flawless appearance.

Thus, it should be understood that the removable panel 2 coated with a fabric 7 regains its aesthetic appearance while retaining its original properties such as fire resistance, or sound insulation, for example. In addition, since the fabric 7 is preferably made from a sheet of polymeric material such as polyvinyl chloride, the coated removable panel 2 therefore has new properties such as: maintainability, air-, dust- or moisture-tightness, and becomes easily washable.

Furthermore, it should be understood that this invention is interesting because it makes it possible to restore degraded removable panels 2 without having to repeat the holes and cuts which may have been made in said removable panels 2.

Eventually, with this method in particular, each removable panel 2 may be coated with a fabric 7 having various aspects and colours and some very interesting aesthetic atmosphere can then be created by mixing together the aspects and the colours.

As described above, the invention will find an application to any type of degraded false walls in industrial, commercial, institutional buildings, etc. but also in private houses, desired to be easily restored while keeping the existing removable panels.

Furthermore, the invention is not limited to the covering of removable panels 2 having the overall shape of a parallelepiped, but can also make it possible to coat removable panels 2 already cut or modified, having various shapes or even access doors.

In addition, the tensioning devices and the method according to the invention may also be used for producing new false wall panels consisting solely of a frame made of abutted PVC or aluminum sections, for example, whereon a flexible fabric is stretched. These new panels are simple to make and very light because they do not include removable panels 2. Eventually, the present invention is clearly not limited to the sole embodiment of this installation and it encompasses, on the contrary, all the alternative embodiments and applications thereof which follow the same principle.

The invention claimed is:

1. A device for tensioning the fabric of a device for restoring a removable panel, comprising: at least one structure, a thermal chamber arranged inside said structure and able to heat said flexible fabric, an internal frame elastically secured to said thermal chamber, and at least one actuator secured to the structure and able to move the thermal chamber so that, in a first position, the thermal chamber is moved between a fabric at rest position and a fabric stretched position and, in a second position, to move the internal frame between a fabric at rest position and an intermediate position located between said fabric at rest and fabric stretched positions, with the flexible fabric resting on a part of the thermal chamber and being held by its peripheral edge between the internal frame and the structure.

2. The tensioning device according to claim 1, wherein the thermal chamber comprises a hollow box which has the overall shape of a parallelepiped and contains at least one heat generator; further comprising at least a lower face and an upper face provided with a plurality of through-holes for uniformly letting through the heat generated by the heat generator.

3. The tensioning device according to claim 1, wherein the thermal chamber comprises an external frame arranged on the top of the thermal chamber's upper face and made from abutting sections having the overall shape of an open L, each comprising a first flange fixed horizontally to be in contact on the top of said upper face and a second flange for supporting the fabric, configured to create a residual space between the fabric and said upper face when the flexible fabric is stretched.

4. The tensioning device according claim 1, wherein the internal frame comprises abutting sections having globally rectangular cross-sections and is secured to said thermal chamber using elastic fixing members.

5. The tensioning device according to claim 1, wherein the internal frame comprises at least two opposite sections large enough to abut on the structure, with such position defining the intermediate position.

6. The tensioning device according to claim 1, wherein the internal frame comprises holding sections.

7. The tensioning device according to claim 1, wherein said tensioning device comprises two actuators, each one being of the linear electric actuator type integrated in a stable guiding unit.

8. A method for coating a removable panel of a false wall with a restoration device, comprising at least the following steps, in sequence or not:
    tensioning a fabric using a tensioning device comprising at least one structure, a thermal chamber arranged inside said structure and able to heat said flexible fabric, an internal frame elastically secured to said thermal chamber, and at least one actuator secured to the structure and able to move the thermal chamber so that, in a first position, the thermal chamber is moved between a fabric at rest position, and a fabric stretched position and, in a second position, to move the internal frame between a fabric at rest position and an intermediate position located between said fabric at rest and fabric stretched positions, with the flexible fabric resting on a part of the thermal chamber and being held by its peripheral edge between the internal frame and the structure;
    positioning at least two cladding sections facing one another respectively along two opposite areas of a peripheral edge of a removable panel;
    application of removable panel cladding sections assembly onto the stretched fabric;
    application of adhesive onto the periphery of the removable panel cladding sections assembly;
    cutting the excess fabric showing from the removable panel.

9. The coating method according to claim 8, wherein the step of tensioning the fabric using the tensioning device comprises the steps of:
    positioning the fabric on the thermal chamber and the internal frame, with the thermal chamber and the internal frame being in the fabric at rest position;
    starting at least one heat generators;
    moving the thermal chamber by at least one actuator from the fabric at rest position to the intermediate position;
    moving the thermal chamber by one actuator from the intermediate position to the fabric stretched position in order to tension the fabric.

10. The coating method according to claim 8, wherein the step of applying adhesive is preceded by a step of grinding the peripheral edge of the removable panel.

* * * * *